J. WALDHEIM.
TYPEWRITING MACHINE.
APPLICATION FILED NOV. 27, 1917.

1,340,864.

Patented May 18, 1920.
7 SHEETS—SHEET 1.

J. WALDHEIM.
TYPEWRITING MACHINE.
APPLICATION FILED NOV. 27, 1917.

1,340,864.

Patented May 18, 1920.
7 SHEETS—SHEET 5.

Witnesses:

Inventor:
John Waldheim
by B C Stickney
Attorney

UNITED STATES PATENT OFFICE.

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING-MACHINE.

1,340,864.   Specification of Letters Patent.   Patented May 18, 1920.

Application filed November 27, 1917. Serial No. 204,157.

*To all whom it may concern:*

Be it known that I, JOHN WALDHEIM, a citizen of the United States, residing in Elizabeth, in the county of Union and State of New Jersey, have invented certain new and useful Improvements in Typewriting-Machines, of which the following is a specification.

This invention relates principally to the class of typewriting machines in which a single platen may coöperate with two sets of systems of types, whereby, when typewriting a page in one language, some of the words may be typewritten in a foreign language, or whereby some words may be typewritten in italic among others written in roman. It has been proposed to place one type-system by the side of another, and to displace the platen from side to side of the machine, to position to coöperate with either type-system; each type-system having a separate keyboard.

One of the objects of the present invention is to avoid the necessity of displacing the platen from one side of the machine to the other, and to avoid the bulky dimensions that are necessary where one type-system is placed by the side of another, and further to avoid the necessity for the operator to shift his hands from one keyboard to another.

To these ends, I arrange the types of both type-systems to strike all at one printing point, so that the platen need never be displaced endwise for bringing it into coöperation with one or the other sets of type-bars, but its travel may be confined within the range usual in machines having but a single system of type-bars. The type-bars of one system preferably alternate with those of the other system, and each key is preferably connected to two type-bars, one in each system, and means are provided, preferably controlled by a key in the keyboard, for selecting the system to be operated.

In each system of type-bars there are provided both upper and lower-case types, and case-shifting mechanism is employed in each system, for bringing either capital types or lower-case types into use.

In order to condense all of the type-bars in both systems within such limits as to avoid the necessity of making the type-bars unduly long, I employ relatively long type-bars for one system and relatively short type-bars for another system, the short type-bars alternating with the long type-bars. Each type-bar carries upper and lower-case types, and for compactness the types on the short type-bars (which lie between the shanks of the long type-bars), are made to shift radially, so that the shifting movement of each type is in a direction lengthwise of the bar, and hence none of these radially-shifting types needs to project very far laterally from its type-bar, and hence may lie compactly between the shanks of the adjacent long type-bars.

In one arrangement, I have shown upper and lower-case types on the type-blocks in each set. I have also shown another arrangement in which the capitals of different styles of type are on the type-blocks of one set of type-bars and the corresponding small letters on the type-blocks of the other set of type-bars. With the latter arrangement, the same mechanism is used as in the former arrangement, except that the case-shifting mechanism becomes the style-shifting or selecting mechanism and vice versa.

To view certain features of the invention from a somewhat different standpoint, it will be seen that a selection of any one of four different kinds of types may be made without shifting the platen.

For the selection of the active set of type of the two sets on one set of type-heads, these type-heads have a normal position corresponding to the printing with one set of type thereon and an abnormal position corresponding to the printing with the other set of type thereon. The abnormal position is determined by a rail, which shifts each type-head as it moves up to print. There may be two of these rails, one for each set of type-heads, and they are adjusted to a shifting position by a shift-key.

The selection between sets of type-bars to be used is made by having each pair of type-bars, one in each set, operated by a floating lever, which, in turn, is operated by a character key. Each floating lever may have alternative fulcrums, so that when a lever fulcrums at one end, one of the connected pair of type-bars is actuated, and when it fulcrums at the other end, the other of the pair of type-bars is actuated. The fulcrums for the two series of type-bars and their common floating levers may consist in a pair of plates or circular combs, having a series of spaced teeth, which form alternate ridges or obstructions and slots. The ridges or teeth on one plate are radially opposite the slots on the other plate. Thus, the floating levers may engage all fulcrums on one plate or the other according to whether the ridges or slots of that plate are in register with the floating levers. The two plates are united, to form a segment, so as to move as a unit, and thus bring either the slots or ridges of one plate or the other in register with the floating levers. If the slots of one plate are brought in register with a series of floating levers, the fulcrum ridges of the other plate will at the same time be brought into register therewith. In this way, the fulcrum of each floating lever is alternatively either on one side or the other side of the point of connection of the operating type-key thereto, whereby either the type-bar of one set or the type-bar of the other set will be operated. The position of the segment may be changed by a shift key, to give the selection between the two sets of type-bars.

In respect to the short type-bars, there is no need to provide case-shifting mechanism for the platen. Preferably, the long type-bars are also provided with radially-shifting types; but it will be understood that since there is considerable room at the free ends of the long type-bars, it is not necessary to limit the invention to the use of a radial shift for the long type-bars, or to the use of shifting types on the long type-bars. A modification of the invention is shown, in which I have shown a platen-shift in combination with the long set of type-bars, which have their type-blocks rigidly secured thereto and set at various angles on the type-bars, as in the Underwood standard typewriter. I have shown, in connecton with this form, a case-shifting means for causing the type-blocks of the short type-bars to be shifted radially as in the preferred form of my invention. Either one of the two sets of types may be selected by a style-shift or selecting key. A case-shift-key is used which is adapted to actuate the platen-shift mechanism for one set of type-bars. The same key is used to actuate the case-shift mechanism associated with the type-blocks of the other set of type-bars. Both of these case-shift mechanisms are under the control of the style-shift key, so that they may thereby be connected to the case-shift-key. Thus, it will be seen that in this form of my invention, there is provided a case-shift-key which may actuate either one of two case-shift-mechanisms, and that effectiveness of the case-shift-key is under the control of a style-shift-key.

From the foregoing, it will be understood that in the different forms of my invention the same keyboard may be rendered effective, by means of a key, to bring the types of either set to the printing point, and that by suitable mechanism, operated by another key, the types in either set may be caused to print either upper-case or lower-case letters. Some of the features are in the nature of improvements which may be used in connection with other kinds of typewriting machines, and especially those shown in my co-pending applications, Serial No. 196,797, filed October 16, 1917, and Serial No. 199,722, filed November 1, 1917.

Other features and advantages will hereinafter appear.

In the accompanying drawings,

Fig. 9 is a view of the parts shown in Fig.

8, except that it is not broken away. This view illustrates one of the type-bars off to one side.

Considering more particularly the separate parts of the invention, character keys 1 depress key-levers 2 to rock same about an intermediate pivot 3. Each key-lever is connected to rock a bell-crank 4, about a fulcrum 4ª intermediate the ends thereof, to swing a floating lever 5, pivoted at 5ª, to the upper end of the bell-crank 4. These upper ends of the bell-cranks 4 are bent so as to lie in radial planes which intersect at the printing point. This is done so that the floating levers may be radially disposed in substantially the same planes with the links 6 and 7 and type-bars 8 and 9, to which the links are connected. There are two sets of type-bars 8 and 9, the type-bars of one set being alternately placed between those of the other set, and both sets are supported on suitable segments 8ª and 9ª, respectively, which may be of any well-known construction. When a type-bar of either set is operated, it is swung up rearwardly to cause roman style of types, indicated generally at 10, or italic style of types, indicated generally at 10ª, depending upon the set to which the type-bar belongs, to strike the platen 11, which may be mounted to rotate on a carriage of any well-known character.

The sets of type-bars 8 and 9 are provided with different styles of types 10 (roman) and 10ª (italic), respectively. To selectively render either the roman types 10 or italic types 10ª effective, or, in other words, to determine which set of type-bars 8 and 9 shall be in use at any particular time, there is provided a style-shift-key 12, which, when depressed, rocks a shift-lever 13 about a pivot 14, so as to rock a bell-crank 15 (Figs. 1, 2 and 7), having a pin-and-slot connection 16 with a pair of fulcrum plates 17 and 18. The fulcrum plates 17 and 18 may be curved and are connected by strips 19 to form a segment 20 to move so that the fulcrum plates 17 and 18 may move as a unit. The segment 20 is supported for easy movement by means of rollers 21 on a suitable support. The rollers engage in grooves 21ª, provided in the segment. The segment 20 has a normal position, illustrated in Fig. 2, and is moved against the tension of a spring 22, by the key 12, to the Fig. 7 position. The limits of movement of the segment are determined by a pin 23, which extends between two stops 24 and 24ª, having enough space between them to allow the required amount of shifting of the segment. It will be understood that these stops may be adjustable so as to effect the proper movement of the segment 20.

Figure 1:
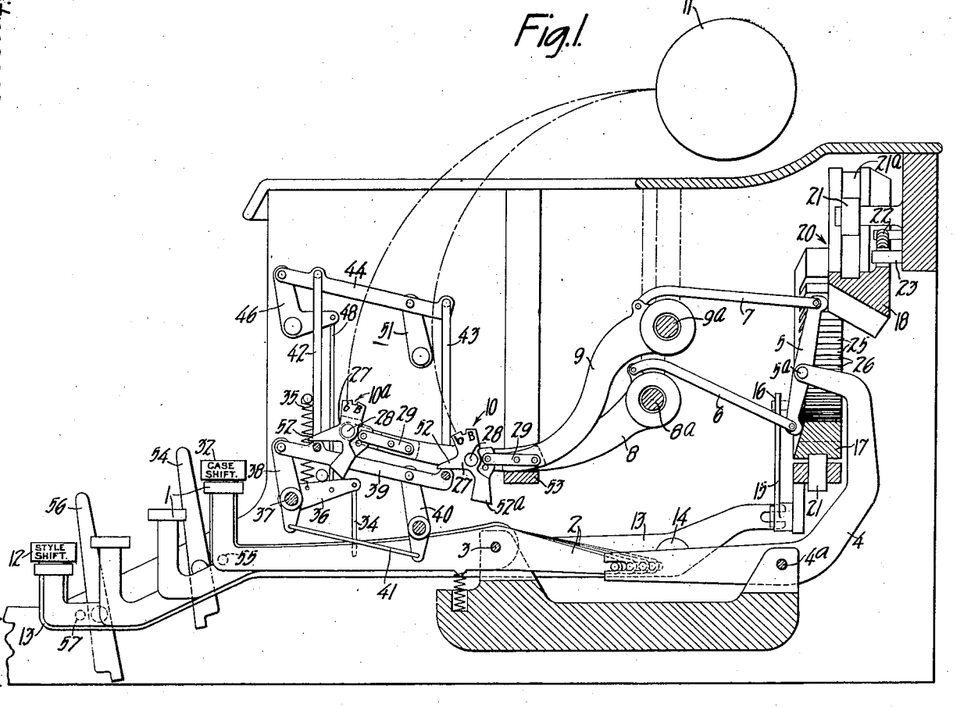
Figure 1 is a vertical section, taken from front to rear with parts omitted to simplify the showing. In this view the machine is in a condition to print small, vertical characters corresponding to a fulcruming of the lower ends of the floating levers, and thus the use of the top set of type-bars and the front set of types thereon.
Figures 3, 4:
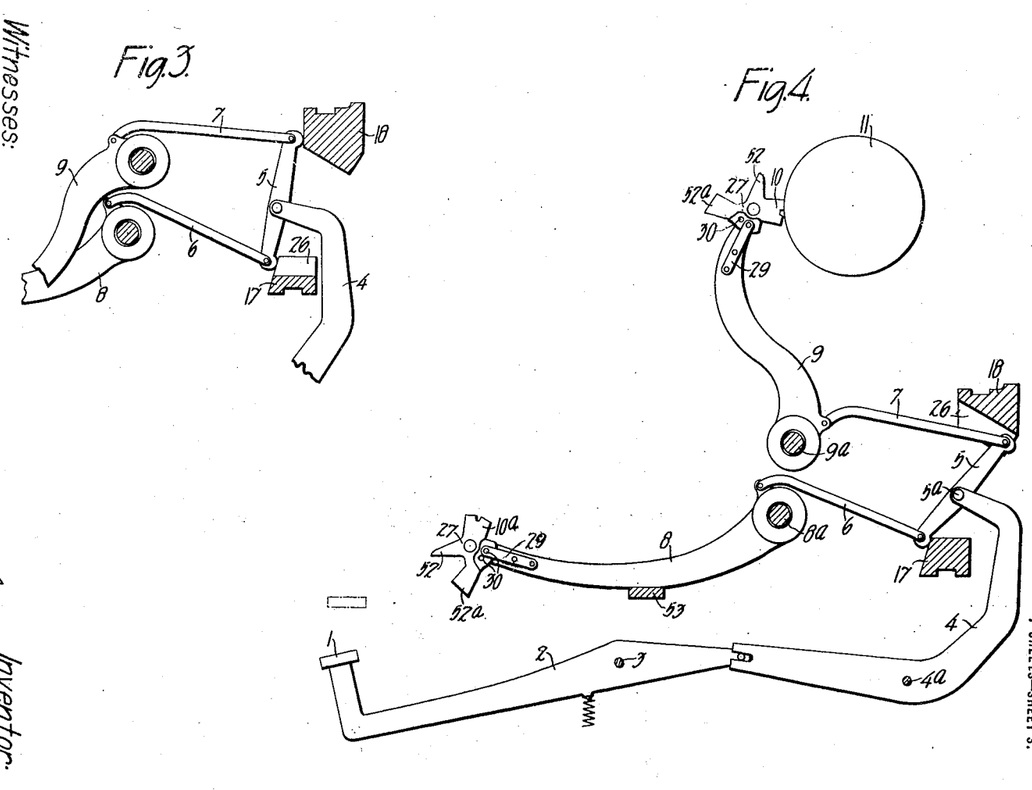
Fig. 3 is a detail vertical section, taken from front to rear, showing the fulcrum segment shifted from the Fig. 1 position, so that instead of using the top set of type-bars, the bottom set will be used.
Fig. 4 is a detail section, taken from front to rear, showing a type-bar in the act of striking the platen; the type-head and the segments are in their normal position corresponding to the position of Fig. 1, with neither of the shift-keys operated.
Figure 7:
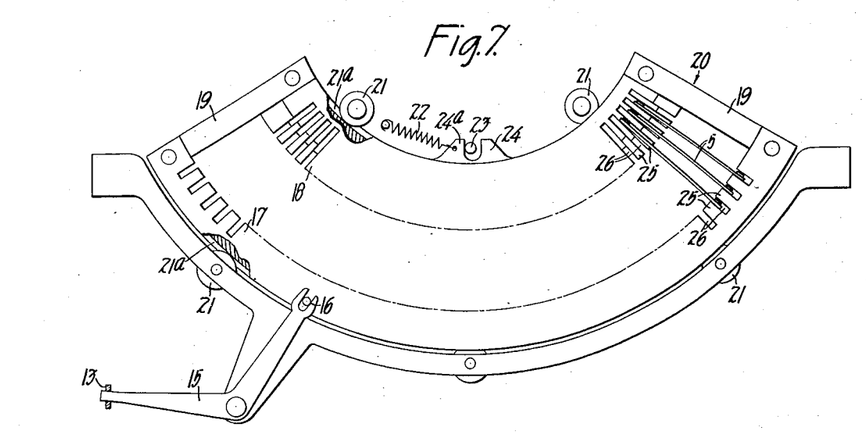
Fig. 7 is a detail view, in front elevation, of the fulcrum segments, showing them connected as a unit and in their shifted position; the style-shift-key is, therefore, in its depressed position.
Figure 8:
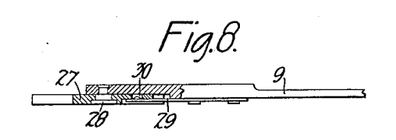
Fig. 8 is a horizontal view of part of one of the type-bars, with the type-head broken away to show the pivotal connection thereof to the type-bar and the means of yieldingly locking the type-head in either of its adjusted positions.
Figure 9:
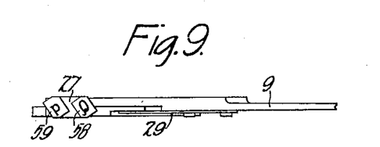

The purpose of the plates 17 and 18 is to form alternative fulcrums for the lower and upper ends of the floating levers 5. In Figs. 1 and 4, the lower plate 17 forms the fulcrum for the floating levers 5. In Figs. 3 and 7, the upper plate 18 forms the fulcrum for the upper end of the floating levers 5. The alternation of the fulcrums is obtained by having the plates of the segment formed after the manner of combs with teeth or ridges 25 separated by slots 26. The ridges of the lower fulcrum plate 17 are radially opposite the slots of the upper fulcrum plate 18, and vice versa. The type-actions and thus the floating levers are radially disposed about a common center. This causes the plates 17 and 18 to either act as fulcrums for the lower ends of the floating levers 5 or for the upper ends of the floating levers 5, according to the adjustment of the segment 20.

Figure 2:
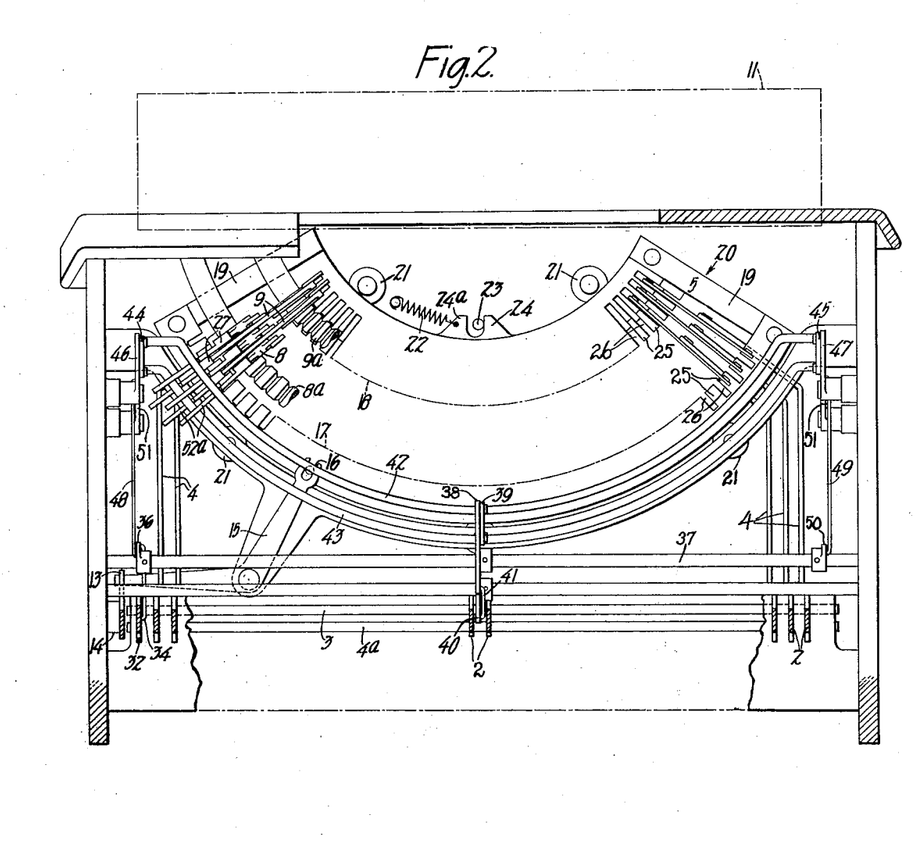
Fig. 2 is a front view in elevation, partly broken away to show the underlying structure, and showing the fulcrum segments in their normal positions in which the top set of type-bars is effective.

Normally, the segment 20 is in the position of Figs. 1 and 2, with the ridges or teeth of the lower plate 17 in register with the levers 5. Under these conditions, when one of the character keys 1 is depressed to rock the bell-crank 4, the bell-crank will tend to draw the associated floating lever 5 rearwardly. The lower end thereof, however, will be blocked against movement by one of the ridges or obstructions 25 and the upper end will enter one of the slots 26, thereby drawing on the link 7 and thus swinging a type-bar 9 up against the platen 11. The slots 26 are preferably long so as to guide the lever 5 in its movement, Fig. 4.

When the italic types 10ª are rendered effective, the shift-key 12 is depressed to shift the segment 20 with the plates 17 and 18 against the tension of the spring 22 to the Figs. 4 and 7 position, in which position the slots in the lower plate 17 will be in register with the lower ends of the levers 5, while the teeth or ridges of the upper plate 18 will be in register with the upper ends of the floating levers 5. Thus, when one of the character keys 1 is depressed, the upper end of the corresponding floating lever is obstructed in its movement, so that the link 6 is drawn on to operate one of the type-bars 8 of the bottom set to cause italic types 10a to strike the platen 11.

Figures 5, 6:
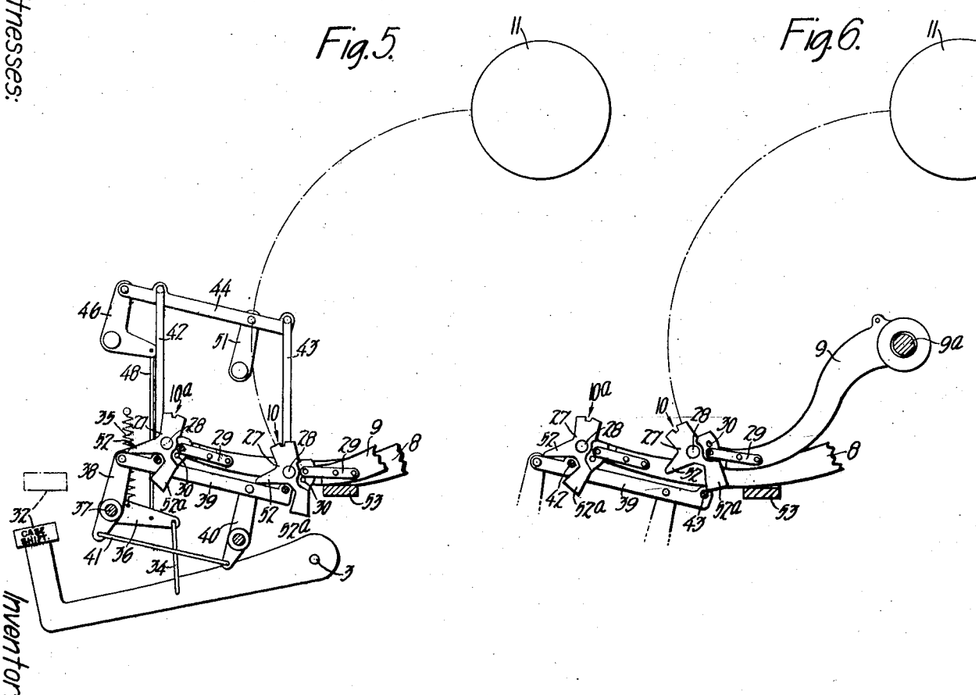
Fig. 5 is a skeleton vertical section, taken from front to rear, showing the case-shift key, for changing from lower to upper-case, as actuated, but before the type-bar has been operated, so that the type-head is in its normal position.
Fig. 6 is a detail view, with the parts shown in the same position as in Fig. 5, except that the type-bar has started in its upward movement, and the type-head thereon cammed about its pivot to change to upper-case writing for that particular type-bar.

In addition to the selection in printing with different styles of type by two different sets of type-bars, case-shifting-mechanism is provided for the types on each set of type-bars. For this purpose, in this form of my invention, each type-bar has a swinging-type-head 27, which is pivoted to the type-bar at 28. Each type-head is normally locked in the position of the heads in Figs. 1 and 5, by spring detents 29 to yieldingly engage in sockets 30, of which there are two, provided in each type-head. The type-heads can be swung around to the position of the right-hand type-head in Fig. 6, in which the detent 29 enters the other socket 30 to yieldingly lock the type-head in its alternate position to that of Fig. 5. As indicated by the dotted arcs in Figs. 1 and 6, the different positions of the type-heads correspond to the printing with lower and upper-case types respectively on the heads 27. In the position of Fig. 1, the lower-case type is used, and, in Fig. 6, the upper-case type is used. Normally, that is to say, before case-shifting operations, either one of the type-bars 8 and 9 may be operated to print with lower-case type, as indicated in Fig. 1.

To perform case-shifting operations, there is provided a case-shift-key 32. This key when depressed to its Fig. 5 position about its pivot 3 draws down on a link 34, so as to rock downwardly against the tension of a spring 35 and an arm 36. The arm 36 is secured to a shaft 37, so as to rock the same, thereby moving a lever 38, secured thereto, to thrust rearwardly on a link 39. The link 39 is operated so as to have a substantially parallel movement by means of a second lever 40 connected by a link 41 to the lever 38. The link 39 shifts a pair of curved, obstructing or camming rails 42 and 43 from their Fig. 1 position to their Fig. 5 position, thereby rendering the case-shifting means comprising the two latter elements effective. To maintain the camming rails 42 and 43 in their movement substantially parallel, there is provided, in addition to the link 39, links 44 and 45 at the ends of the rails 42 and 43 to support and guide the rails when moved. Bell-cranks 46 and 47 move the links 44 and 45, to which they are respectively connected. The latter, in turn, are operated by links 48 and 49 connected respectively to the arm 36 and a similar arm 50 secured to the rock shaft 37. The links 44 and 45 are additionally supported and guided in their movement by pivoted arms 51.

The rails 42 and 43 underlie the outer ends of lugs 52 of the type-heads 27. When the case-shift-key 32 is operated, however, the rails are moved to the position indicated in Figs. 5 and 6. This change of position of the obstructing bars 42 and 43, however, does not change the position of the type-heads 27 until a type-bar is actually operated. When a type-bar is operated from the Fig. 5 position, the corresponding rail 42 or 43 is engaged by a heel or cam 52a of type-head 27 and rocks the type-head about its pivot 28 from the Fig. 5 position to the Fig. 6 position (right-hand type-head). When the type-head leaves the rail 43, it is held in its shifted position by the detent 29 and swings up to the platen 11, so as to cause the other type, preferably upper-case, thereon, to strike the platen. When the type-bar swings back from the platen to its normal inactive position, the type-head 27 is automatically rocked from its Fig. 6 to its Fig. 5 position by the lug 52 engaging with the rail 43. As there are two of the rails 42 and 43 operated in unison, the case-shifting mechanism is simultaneously controlled for both sets of type-bars 8 and 9. The particular set of type-bars in use is dependent on the position of style-shift-key 12.

A suitable type-bar-rest 53 is provided, which supports the forward ends of the type-bars 8 and 9 in their normal positions, as indicated in Fig. 1. It will be seen by an inspection of Fig. 1 that the lugs 52 are normally out of engagement with the obstructing bars 42 and 43. This slight clearance may be caused by the detents 29, the pointed ends of which position the type-block 27 relatively to the type-bar and moves the type-block slightly after the latter has returned to its normal position, thereby raising the lug 52 out of engagement with the associated obstructing bar 42 or 43. This is done to avoid any unnecessary friction when the obstructing bars 42 and 43 are moved during a case-shifting operation.

The style-shift-key 12 and the case-shift-key 32 may be locked in their depressed position, if desired for a continuous writing with the set of types controlled thereby. In the case of the shift-key 32, there is provided a locking lever 54, pivoted on the machine frame, as shown in Fig. 1, which may be swung at will over a pin 55 on the case-shift-key to hold it in its depressed position. A similar locking lever 56 may be provided for the style-shift-key to engage with a pin 57 thereon. The locking levers 54 and 56 may be held in their effective or ineffective positions by a detent or any other suitable holding means.

Figure 10:
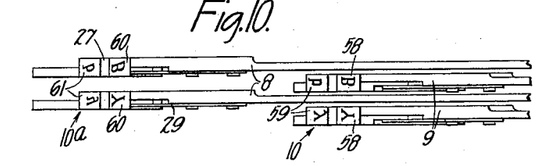
Fig. 10 is a view of four central type-bars, two of each set, showing the different styles of print and upper and lower-case types of the same style of print on each set of type-bars.
Figure 11:
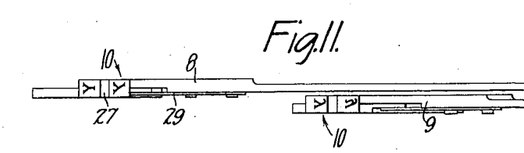
Fig. 11 is a view of two central type-bars, one of each set, with the types so arranged that the capital letters of different styles of type are on one type-bar and the small letters on the other type-bar. These types are arranged to suit a modified form of this invention, which will hereinafter be clearly described.

It will thus be seen that the machine is adapted to typewrite with any one of four different types. These types are shown in Figs. 10 and 11. In Fig. 10, the top set or short type-bars 9 are provided with vertical or roman capital letters or upper-case types, indicated at 58, and vertical or roman small letters or lower-case types, indicated at 59. The bottom set or long set of typebars 8 are provided with italic capital letters, indicated at 60, and small italic letters indicated at 61. This gives the printing with the top set of type-bars 9 in typewriting with roman characters a selection between small letters and capitals, and with the bottom set of type-bars 8 a selection between small letters and capitals.

It will be understood that each set of typebars is provided with a complete set of alphabetical types and that other characters including numerals may also be included on the type-blocks of each set of types.

Figure 12:
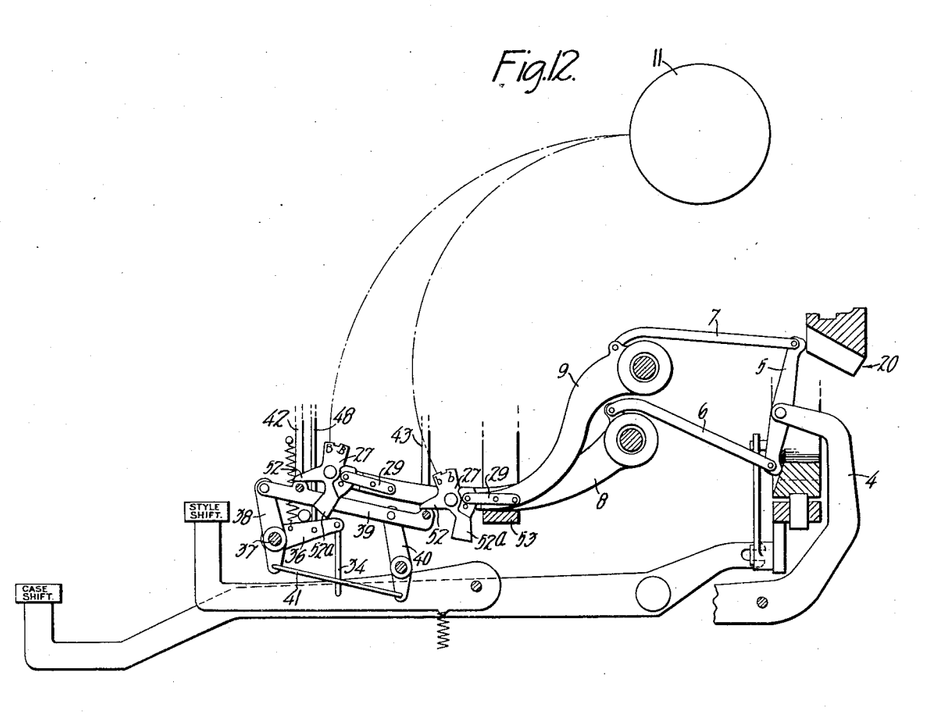
Fig. 12 is a skeleton side view, showing the types arranged on the type-bars as indicated in Fig. 11, and the style-shift and case-shift-keys interchanged, so as to properly actuate the mechanisms controlled thereby, according to arrangement of types.

The obstructing bars 42 and 43 may be used for selecting the style of type and the segment 20 for case-shifting. For this purpose, the types are arranged on the type-bars as shown in Fig. 11, and as indicated diagrammatically on the type-blocks 27, Fig. 12. It will be seen that for this purpose exactly the same mechanism is used as in Fig. 1, except that in Fig. 12, the style-shift-key of Fig. 1 is made the case-shift-key and the case-shift-key is made the style-shift-key. Thus, to write with lower or upper-case types, the two sets of type-bars 8 and 9 may be rendered effective respectively one at a time by the case-shift-key, to move the segment 20 to properly position the fulcrum plates with which the floating levers 5 coöperate according to the desired set of type-bars. To select the italic style of type in Fig. 12, the style-shift-key is actuated to move the obstructing bars 42 and 43 into the path of the heels 52ª of the type-blocks 27. If a character key is now depressed, the type-block on the type-bar actuated thereby will be shifted as hereinbefore-described, but in this case the corresponding type of the italic style is rendered effective.

Figure 13:
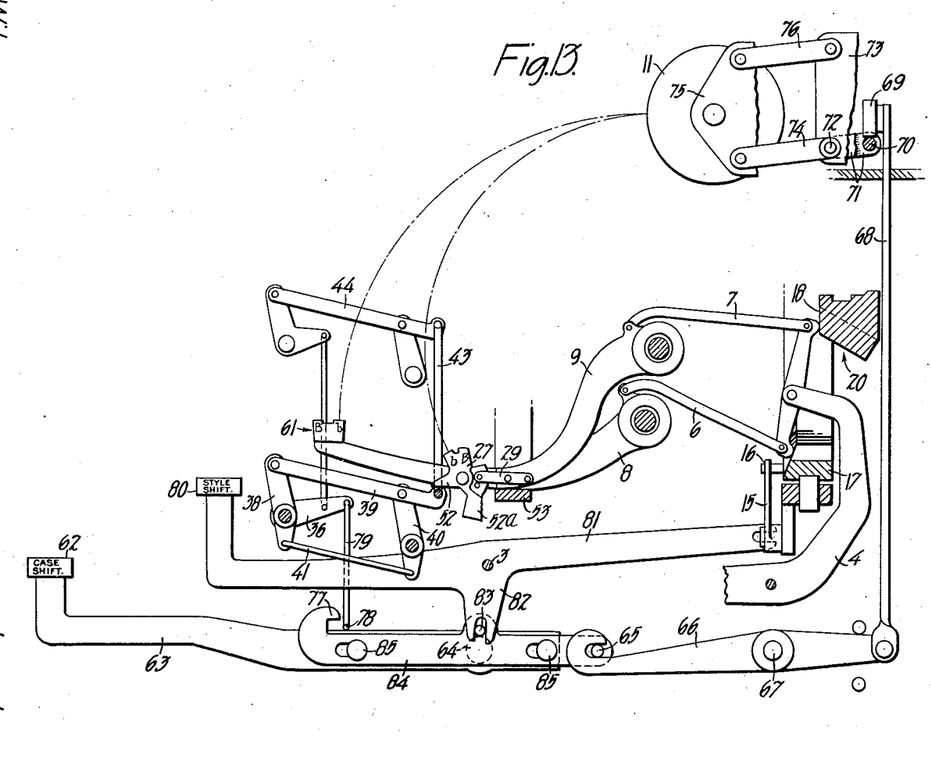
Fig. 13 is a modification, showing the means for shifting the platen in combination with the long set of type-bars, and the means for causing the types to be shifted in combination with the short set of type-bars; both of these case-shifting-mechanisms being actuable by a single case-shift-key, the effectiveness of which is under the control of a style-shift-key.

In Fig. 13, I have shown a modified form of my invention, in which the types 61 are rigidly secured to the long type-bars 8 and are set on the type-bars at such an angle relative to the shanks of the type-bars, as in the Underwood standard typewriter, so that the types 61 will strike the platen 11 vertically. In combination with this set of types 61, I have shown case-shifting-mechanism, preferably a platen-shift comprising a case-shift-key 62, which, when depressed, swings a lever 63 about a pivot 64 to cause a pin 65 controlled by said lever to swing a lever 66 about its pivot 67 and pull downwardly on a link 68, which may be guided so as to have a roller 69 at its upper end overlie a cross-bar 70 to move the latter downwardly and shift the platen 11 from lower to upper-case position. The cross-bar 70 is supported at its ends by two arms 71 extending rearwardly from a rock shaft 72 supported for swinging movements on a typewriter carriage 73, which may be guided to travel crosswise of the machine in any well-known manner. The rock shaft 72 is provided with forwardly-extending arms 74, which, when the platen is being shifted from lower to upper-case position, swing upwardly to raise a platen frame 75 carrying the platen 11. To assist in guiding the platen-frame during case-shifting movements of the platen 11, parallel links 76 are provided.

In addition to the platen-shifting mechanism, some of the case-shifting mechanism indicated in Fig. 1 is used which causes the type-blocks 27 to be shifted about their pivots 28. In this form of my invention, I use only the obstructing bar 43 which is associated with the type-block on the short set of type-bars 9. Thus, it will be seen that when the case-shift-key 62 is depressed at a time when a hook 77 on the lever 63 overlies a bent-off portion 78 on a link 79, the latter will be pulled downwardly to swing the arm 36, and thus move the obstructing bar 43 forwardly, to its effective case-shifting position, by means of the arm 38 and links 39 and 44, as hereinbefore described.

To select the different styles of type, namely, the roman and italic types, a style-shift-key or selecting-key 80 is provided, which, when actuated swings a lever 81 pivotally mounted on the fulcrum rod 3 to actuate the segment 20, thereby properly positioning the fulcrum plates 17 and 18, to render either set of type-bars effective. In this form of the invention, as distinguished from that illustrated in Fig. 1, the position of the segment 20 is such as to cause teeth 25 thereof to normally act as fulcrums for the upper ends of the levers 5, so that the character keys are normally effective upon the type-bars 8. On depressing the style-shift-key 80, the segment 20 is moved so as to cause other teeth 25 thereof to act as fulcrums for the lower ends of the levers 5, thus causing the character keys to be effective upon the type-bars 9.

I have provided automatically-actuated means for connecting either the platen-shift or the type-block-shift to the shift-key 62, which is preferably controlled by the style-shift-key 80. This is done when the segment 20 is shifted for type-bar-selecting.

For this purpose, the style-selecting-lever 81 is provided with a downwardly-projecting arm 82 engaging with a pin 83, to slide a bar 84, guided in its movement and supported on the case-shift-lever 63 by studs 85, to move the slide-bar rearwardly, thereby causing a disengagement of the pin 65 with the lever 66, thus disconnecting the platen-shifting-mechanism from the case-shift-key 62. At the same time, the hook 77 is moved into engagement with the bent-off portion 78 of the link 79, to connect the case-shift-mechanism for the type-block 27 with the case-shift-key. The link 79 may be guided in any suitable manner, so as to maintain the connection with the hook 77 during the actuation of the latter. Suitable locking levers, as indicated in Fig. 1, may be provided to hold the case-shift-key 62 and the style-shift-key 80 in their actuated positions. Suitable stops may also be provided to limit the movements of said keys.

Variations may be resorted to within the scope of the invention, and portions of the improvements may be used without others.

Having thus described my invention, I claim:

1. The combination with a platen, of a plurality of sets of type-bars, the type-bars of each set normally lying side by side, and all of said type-bars being individually swingable from their normal positions to a single printing point, a single set of keys, means for selectively placing one of said sets of type-bars under the control of said keys, so that each type-bar will be actuated only by the key corresponding thereto, a plurality of types on each of said type-bars, and means for shifting the types on the type-bars of the selected set, so that actuation of a type-bar by the corresponding key will effect printing in accordance with the condition of the shifting means.

2. The combination with a platen, of a plurality of sets of type-bars having a common printing point, the type-bars of each set having thereon types of a plurality of alphabets, a fixed pivot for each of said type-bars to enable the latter to be swung from its normal position to engage the platen at said printing point, a single set of keys, the number of which is the same as that of the type-bars in each set, means whereby said keys may be made effective to actuate the corresponding type-bars of a selected set, and means for determining for the selected set of type-bars the alphabet thereon in which printing is to be effected, comprising means whereby the types may be selectively positioned on the type-bars.

3. The combination with a platen, of a plurality of sets of type-bars independently swingable from normal position to engage the platen at a common printing point, the type-bars of each set having thereon types of a plurality of complete alphabets, only one letter of each alphabet being on a single type-bar, a single set of keys including alphabet keys, means whereby each alphabet key may be made effective to actuate the corresponding type-bar of a selected set, and means for shifting the types on the type-bars of the selected set to determine which alphabet on the type-bars of the selected set shall be effective to print.

4. The combination with a platen, of a plurality of different sets of type-bars, the number of type-bars in the different sets being the same, each type-bar having a plurality of types movable to and from effective position thereon, a single set of character keys, the same in number as the type-bars in each set, means whereby each key may be made effective to swing the corresponding type-bar of a selected set against the platen, and shifting mechanism whereby the types in effective position on the type-bars of the selected set may be varied at will, so that actuation of the type-bars of the selected set by their respective keys may effect different kinds of printing in accordance with the action of said shifting mechanism.

5. The combination with a platen, of a plurality of sets of type-bars, the type-bars of each set normally lying side by side, and all of said type-bars being individually swingable from their normal positions to a single printing point, a single set of keys, means for selectively placing one of said sets of type-bars under the control of said keys, so that each type-bar will be actuable only by the key corresponding thereto, a plurality of types on each of said type-bars, a special key, and means controlled by said special key for shifting the types on the type-bars of the selected set, so that actuation of a type-bar by the corresponding key will effect printing in accordance with the condition of the shifting means.

6. The combination with a platen, of a plurality of different sets of type-bars, the number of type-bars in the different sets being the same, each type-bar having a plurality of types movable to and from effective position thereon, a single set of character keys, the same in number as the type-bars in each set, means whereby each key may be made effective to swing the corresponding type-bar of the selected set against the platen, a special key, and shifting mechanism controlled by said special key whereby the types in effective position on the type-bars of the selected set may be varied at will, so that actuation of the type-bars of the selected set by their respective keys may effect different kinds of printing in accordance with the action of said shifting mechanism.

7. The combination with a platen, of a plurality of sets of type-bars, each set having a different style of type, each type-bar having a plurality of types movably mounted thereon, the types of all of the type-bars having a common printing point, actuating means effective on said sets of type-bars, one at a time, and type-case-shift mechanism, including a key and means controlled thereby for varying the positions of said types relative to said bars, so as to selectively determine which of said types shall be effective.

8. The combination with a platen, of a plurality of different sets of type-bars coöperating with said platen, each of said type-bars having an adjustable head carrying a plurality of different types, mechanism for selecting the particular set of type-bars to be actuated, said mechanism including shifting fulcrums coming into active register with the set of type-bars selected, leverages for operating any of said sets of type-bars selectively, according to the position of said fulcrums, and case-shifting means dominating the type-heads on all of said sets of type-bars, acting to cause a selection of the type in action by an adjustment of the type-head on a type-bar when the latter is actuated to strike the platen.

9. The combination with a platen, of a plurality of different sets of type-bars coöperating with said platen, each type-bar having an adjustable head with a plurality of different types thereon whereby sets of several different kinds of types are obtained actuating means for said sets of type-bars, and mechanism for selecting any one of the several sets of types to be made effective, by rendering said actuating means effective for a particular set of type-bars and by effecting suitable movement of the type-heads on said bars upon actuation thereof.

10. The combination with a platen, of two sets of type-bars, each having a plurality of types thereon, keys, connections from said keys to said type-bars by which the latter may be operated, an obstructing device associated with said connections to determine the effective set of type-bars, and another obstructive device to determine which of the types on each of the selected set of type-bars should be effective.

11. The combination with a platen, of a plurality of sets of type-bars coöperating with said platen, a plurality of floating levers for operating said type-bars, each floating lever being connected to a plurality of type-bars, one in each set, character keys connected to operate said floating levers, and two series of alternately disposed shiftable fulcrums for said levers, said fulcrums being shiftable in a direction transverse to the planes of movement of said levers so as to vary their effective relations therewith and thus cause said character keys to selectively operate one set of type-bars at a time, according to the relative positions of said fulcrums and said levers.

12. The combination with a platen, of a plurality of sets of type-bars coöperating with said platen, the type-bars of one set alternating with those of the other set, each type-bar having a plurality of types thereon, the types of all of the type-bars having a common printing point, a plurality of intermediate elements, each intermediate element being connected to a plurality of type-bars, one in each set, keys connected to actuate said intermediate elements, means coöperative with said intermediate elements, means for shifting said coöperative means, so that the intermediate elements may be actuated differently by said keys, to actuate the type-bars of any one of the different sets, and means for selecting any one of the types on each type-bar.

13. The combination with a platen, of two sets of type-bars having a common printing point, the type-bars of one set alternating with those of the other set, a plurality of intermediate elements for operating said type-bars, each intermediate element being connected to two type-bars, one in each set, keys connected to actuate said intermediate elements, controlling means coöperating with said intermediate elements to vary their movements when actuated, and means for varying the relations between said controlling means and said intermediate elements by shifting said controlling means in a direction transverse to the planes of movement of said intermediate elements, thus causing them to be actuated differently by said keys to actuate the type-bars of the different sets.

14. The combination with a platen, of a plurality of sets of type-bars coöperating with said platen, each type-bar having a plurality of types thereon, a plurality of intermediate elements for operating said type-bars, each intermediate element being connected to a plurality of type-bars, one in each set, keys connected to actuate said intermediate elements, a plurality of fulcrum plates for said intermediate elements, means for changing the position of said fulcrum plates, to render any one of said sets of type-bars effective, and means for selecting any one of the types on each type-bar.

15. The combination with a platen, of a plurality of sets of type-bars coöperating with said platen, types on said type-bars, said type-bars being arranged in arcuate groups, a plurality of radially disposed intermediate elements arranged in an arcuate group, each intermediate element being connected to a plurality of type-bars, one in each set, means, including keys, for actuating said intermediate elements, and an arcuate controlling member for said intermediate elements, said member being shiftable circumferentially to vary its controlling relation with said elements so as to selectively render any one of said sets of type-bars effective on operation of said keys.

16. The combination with a platen, of a plurality of sets of type-bars coöperating with said platen, types on each of said type-bars, said type-bars being arranged in arcuate groups, an arcuate group of radially disposed floating levers, a single set of keys, a set of levers controlled by said keys, said floating levers being pivotally supported on said last-mentioned levers, each floating lever being connected to a plurality of type-bars, one in each set, slidably mounted arcuate fulcrum plates for said floating levers, and means, including a key, for shifting said plates, to render any one of said sets of type-bars effective with said keys.

17. The combination with a platen and two sets of radially disposed type-bars arranged in arcuate groups and having a common printing point, of a single set of keys, each key being adapted to operate two type-bars, one in each set, a single set of radially disposed intermediate levers arranged in an arcuate group, each intermediate lever being connected to and arranged substantially in the same plane with two type-bars, one in each set, and a set of bell cranks, each bell crank having one intermediate lever pivotally mounted thereon, each bell crank being directly connected to and actuable by a key lever.

18. The combination with a platen, of a plurality of sets of type-bars coöperating with said platen, floating levers connected to operate said type-bars, each having connection with a plurality of type-bars, one in each set, character keys connected to operate said floating levers, fulcrum plates for said floating levers, each plate having alternate fulcruming teeth and slots, the fulcruming teeth on one plate being in register with the slots on the other plate, and means for adjusting the position of said plates, so as to change the points of fulcruming for said floating levers, and thereby determine the set of type-bars to be actuated by said character keys at any particular time.

19. The combination with a platen, of a plurality of sets of type-bars coöperating with said platen, floating levers connected to operate said type-bars, each floating lever being connected to a plurality of type-bars, one in each set, a set of keys to operate said floating levers, an element comprising a plurality of toothed fulcrum plates with which said floating levers may engage, and means for changing the position of said element to bring the teeth of any one of said fulcrum plates into register with said floating levers to determine the set of type-bars to be actuated by said keys.

20. The combination with a platen, of a plurality of type-bars coöperating with said platen, floating levers connected to actuate said type-bars, each floating lever having connection with a plurality of said type-bars, one in each set, character keys connected to operate said floating levers, said type-bars being arranged in an arcuate group or nest, so as to strike said platen at the same point, arcuate fulcruming means for said levers, having alternate fulcruming points and clearances for said floating levers, said arcuate fulcruming means having fulcruming points arranged in a plurality of series, one series for each set of type-bars, and the fulcruming points in one series being staggered relatively to the fulcruming points in the other series, and controlling mechanism for moving said fulcruming means in the arc of a circle to change the fulcruming points thereon in coöperation with said floating levers, so as to change the set of type-bars to be actuated by said character keys.

21. The combination with a platen, of a plurality of sets of type-bars coöperating with said platen, a set of floating levers for selectively actuating different sets of type-bars, a pair of oppositely-facing combs acting as fulcrums for opposite ends of said levers, the fulcruming teeth of said combs being staggered relatively to each other, means connecting said combs to move as a unit, a single set of character keys for actuating said floating levers in one direction or the other, according to the position of said combs, and shifting means for moving said combs as a unit to determine the particular set of type-bars to be actuated by said character keys.

22. The combination with a platen, of a plurality of different sets of type-bars coöperating with said platen, each set of type-bars having a different style of type and each type-bar having an adjustable type-head with a plurality of types thereon, shifting means universal to all type-heads in all sets of type-bars, for controlling the particular character of type to be used in coöperation with said platen and type-bar-actuating means effective on said sets of type-bars, one at a time.

23. The combination with a platen, of a plurality of type-bars, differently disposed in groups, each type-bar having an adjustable type-head with a plurality of types of different character thereon, the type-heads in each group of type-bars being arranged in a line of some sort with each other, shifting means coöperating with each line of type-heads to control the particular type in action on the head of a type-bar, a common connection for the shifting means of the plurality of groups of type-heads for changing the position of the same, and type-bar-actuating means effective on said groups, one at a time.

24. The combination with a platen, of a plurality of sets of type-bars coöperating with said platen, each of said type-bars having an adjustable type-head with a plurality of types thereon, said type-heads being arranged in a plurality of different groups corresponding to said sets of type-bars, means universal to each group of type-heads for shifting the position of the same, to determine the particular kind of types on said heads in action, a parallel linkage for operating said shifting means in unison, so as to dominate all groups of type-heads at once, a case-shift key for operating said parallel linkage, and type-bar-actuating means effective on said sets of type-bars, one at a time.

25. The combination with a platen, of a plurality of sets of type-bars coöperating with said platen, each type-bar having an adjustable type-head with a plurality of types thereon, type-bar-actuating means effective on said sets, one at a time, means for selecting the particular set of type-bars to be actuated, the type-heads on one set of type-bars being differently disposed from the type-heads on the other set of type-bars, a rail universal to the heads on one set of type-bars, a second rail universal to the heads on the other set of type-bars, and means for adjusting the position of said rails, so as to determine the active positions of said type-heads, and thus the kind of types in action at any particular time.

26. The combination with a platen, of two complete systems of type-bars, each system bearing alphabets of capital and lower-case types, the type-bars of one system alternating with the type-bars of the other system, a single set of keys, and means for connecting the keys to operate the type-bars in either system at will.

27. The combination with a platen, of two complete systems of type-bars, each system bearing alphabets of capital and lower-case types, the type-bars of one system being substantially shorter than those of the other system, and means being provided for effecting a radial shifting of the types of the short type-bars.

28. The combination with a platen, of two complete systems of type-bars, each system bearing alphabets of capital and lower-case types, the type-bars of one system being substantially shorter than those of the other system, the type upon all of the bars being radially shiftable, and means being provided for effecting the shifting of the types upon the bars of the system selected for use.

29. A type-action comprising a pair of type-bars side by side, a key connected to both, means for determining upon which type-bar the key shall act, and means to give a case-shift movement to the types upon said type-bars.

30. The combination with a platen, of two complete systems of type-bars, each system having a complete set of alphabet types, the type-bars of each system having upper and lower-case types thereon, both systems of type-bars having a common printing point, key-operated means for actuating said systems of type-bars, said means comprising keys connected to type-bars of each system, means to vary the connections from said keys to said bars so as to selectively determine of which system bars will be operated by said keys, and case-shift mechanism to determine which of the types on a bar shall be effective to print.

31. The combination with a platen, of two complete systems of type-bars, the type-bars of each system having upper and lower-case types thereon, both systems of type-bars having a common printing point, a single set of keys, a set of intermediate elements actuable by said keys, each intermediate element being connected to a plurality of type-bars, one for each set, and means adapted to cause said intermediate elements to be actuated differently by said keys to actuate either set of type-bars.

32. The combination with a platen, of two sets of type-bars, each set of type-bars having a set of types, a plurality of types on each type-bar, the types of the different sets forming a plurality of rows, means for rendering either set of type-bars effective, thereby selecting either type-set, means for determining which row of types in the selected set should be rendered effective, and keys for actuating the type-bars of the effective set, each key being associated with two type-bars, one in each set, and adapted to render effective the types on its associated type-bar.

33. The combination with a platen, of two sets of type-bars, each set having alphabet types of upper and lower-case characters, a single set of keys, each key being connected to two type-bars, one in each set, controlling means for rendering said keys effective to actuate either set of type-bars, thereby selecting either set of type-bars, and means for determining whether the upper or lower-case characters of the selected set of type-bars should be effective, each key serving to actuate one of its associated type-bars in accordance with the operation of said controlling means.

34. The combination with a platen, of two sets of type-bars, each set having alphabet types of upper and lower-case characters, a single set of keys, each key having a connection to two type-bars, one in each set, means for rendering said keys effective to actuate either set of type-bars, thereby selecting either set of types, and case-selecting means settable at will to cause case-shifting operations for the types, said keys being adapted to complete the case-shifting operations.

35. The combination with a platen, of two sets of type-bars, each type-bar having a plurality of types thereon, a single set of keys, connections from said keys to type-bars of each set, an element upon the relative position of which the type-bar connections from said keys are dependent for their effectiveness, means for effecting a relative shifting movement of said element in a direction transverse to the planes of movement of said connections to render said keys effective on type-bars of either of said sets at will, and type-shifting means associated with one of said sets of type-bars.

36. The combination with a platen, of two sets of radially-disposed type-bars, each type-bar having a plurality of types thereon, a single set of keys, means, including a plurality of radially-disposed levers, connecting each key to a type-bar of each set, an arcuate element upon the relative position of which the type-bars of each set are dependent for their actuation, means for effecting a relative arcuate shifting movement between said levers and said element to vary the movements of said levers when actuated so that said keys may be effective on type-bars of either set, and case-shifting means for said types.

37. The combination with a platen, of a set of long type-bars, a complete set of alphabet types thereon, a set of short type-bars, alternating with and lying between the long type-bars, types movably mounted thereon, said bars being disposed in arcuate arrangement with the fulcrums of the short bars in an arc concentric with but of smaller radius than that of the long bars, so that all may be brought to a common printing point at the platen, and mechanism to effect a case-shift movement of the types of the type-bars of the short set.

JOHN WALDHEIM.

Witnesses:
CATHERINE A. NEWELL,
EDITH B. LIBBEY.